(12) United States Patent
Lo et al.

(10) Patent No.: US 9,733,751 B2
(45) Date of Patent: Aug. 15, 2017

(54) FLEXIBLE TOUCH-SENSING MODULE AND DISPLAY DEVICE WITH THE FLEXIBLE TOUCH-SENSING MODULE

(71) Applicant: HANNSTOUCH SOLUTION INCORPORATED, Tainan (TW)

(72) Inventors: Wei-Ren Lo, Tainan (TW);
Ding-Chung Lu, Tainan (TW);
Meng-Chun Hung, Tainan (TW)

(73) Assignee: HANNSTOUCH SOLUTION INCORPORATED, Tainan (TW)

( * ) Notice: Subject to any disclaimer, the term of this patent is extended or adjusted under 35 U.S.C. 154(b) by 121 days.

(21) Appl. No.: 14/704,100

(22) Filed: May 5, 2015

(65) Prior Publication Data
US 2015/0324046 A1    Nov. 12, 2015

(30) Foreign Application Priority Data

May 9, 2014  (TW) .............................. 103208189 U

(51) Int. Cl.
*G06F 3/041* (2006.01)

(52) U.S. Cl.
CPC ............ *G06F 3/0416* (2013.01); *G06F 3/041* (2013.01); *G06F 3/0412* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 8,941,555 B2* | 1/2015 | Yoo ...................... | G09G 3/3208 345/1.1 |
| 2011/0273394 A1* | 11/2011 | Young ..................... | G06F 3/047 345/174 |
| 2013/0293096 A1* | 11/2013 | Kang ....................... | H01H 1/10 313/511 |
| 2014/0065326 A1* | 3/2014 | Lee ........................... | G06F 1/16 428/12 |

* cited by examiner

Primary Examiner — Duane N Taylor, Jr.
(74) Attorney, Agent, or Firm — Haynes and Boone, LLP

(57) ABSTRACT

A touch-sensing module is disclosed. The touch-sensing module includes: a substrate having a first region, a second region and a flexible region configured between the first region and the second region so as to enable the touch-sensing module to have a folded state and an unfolded state; and a sensing layer configured under the substrate and having a first sensing pattern layer and a second sensing pattern layer, wherein the first sensing pattern layer corresponds to the first region and the second sensing pattern layer corresponds to the second region.

18 Claims, 10 Drawing Sheets

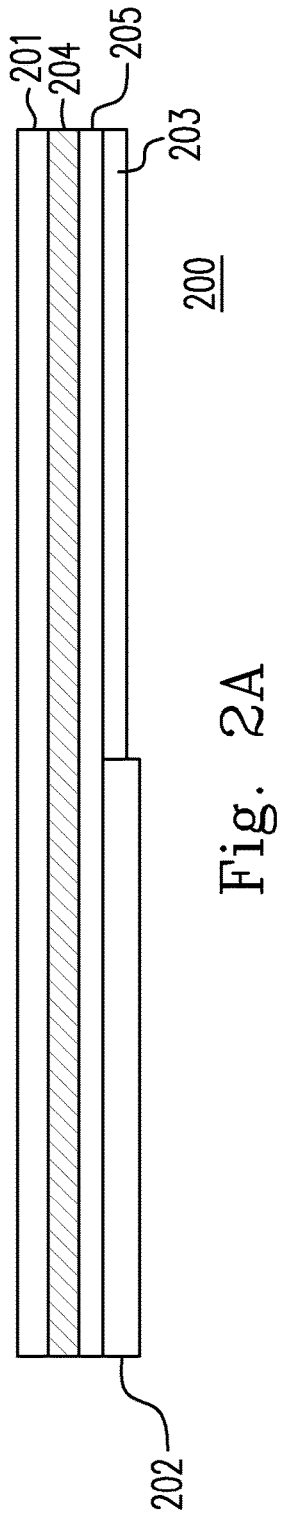
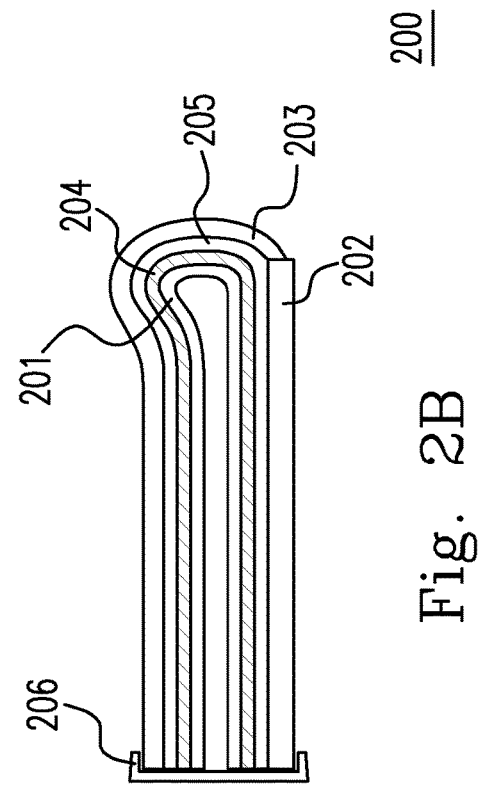
Fig. 2A
Fig. 2B

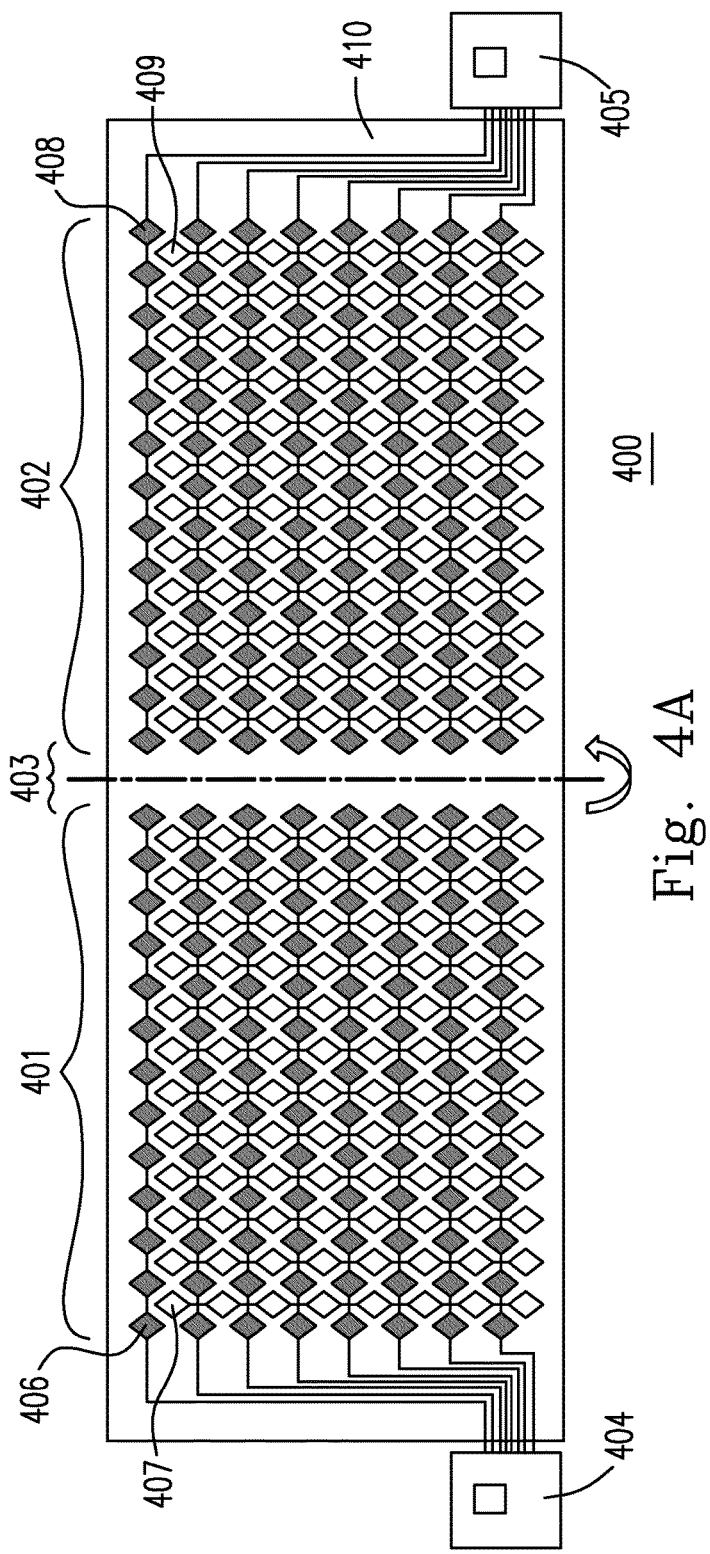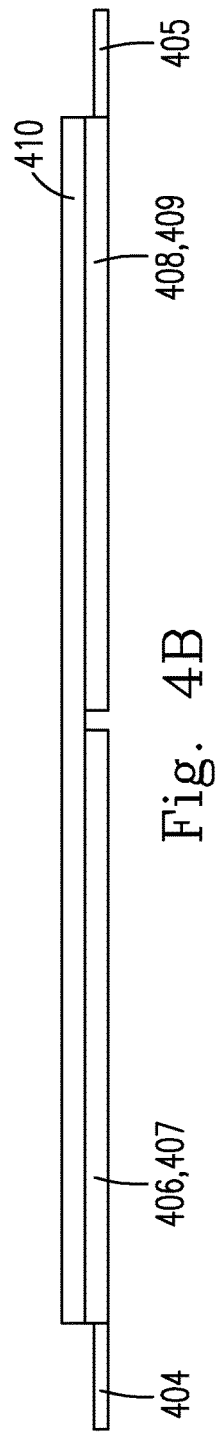
Fig. 4A
Fig. 4B

FLEXIBLE TOUCH-SENSING MODULE AND DISPLAY DEVICE WITH THE FLEXIBLE TOUCH-SENSING MODULE

CROSS-REFERENCE TO RELATED APPLICATION AND CLAIM OF PRIORITY

This application claims the benefit of Taiwan Patent Application No. 103208189, filed on May 9, 2014, at the Taiwan Intellectual Property Office, the disclosure of which is incorporated herein in its entirety by reference.

FIELD OF THE INVENTION

The present invention is related to a flexible touch-sensing module and a display device with the flexible touch-sensing module.

BACKGROUND OF THE INVENTION

Due to the convenience of touch display devices, a touch-sensing module is necessary for a display device, especially for a mobile device. In order to provide consumers with a better visual experience, touch display devices with large-sized displays prevail around the world. In addition, because mobile games are popular, the players need better visibility and better controllability, and so vendors typically provide new mobile phones with a large-sized touch display, such as the Samsung mega (6.3 inches) and the Sony Xperia Z ultra (6.4 inches). However, a large-sized touch display device or a mobile device with a large-sized touch display takes space and is not easy to carry and store, and thus a large-sized touch display device which can be easily carried and easy to store is needed.

Therefore, it would be useful to invent a display device with a touch panel that circumvents all the issues above. In order to fulfill this need the inventors have proposed an invention "FLEXIBLE TOUCH-SENSING MODULE AND DISPLAY DEVICE WITH THE FLEXIBLE TOUCH-SENSING MODULE." The summary of the present invention is described as follows.

SUMMARY OF THE INVENTION

In accordance with an aspect of the present invention, a touch display device is disclosed. The touch display device includes a substrate having a first region, a second region and a flexible region configured between the first region and the second region so as to enable the touch display device to have a folded state and an unfolded state; a sensing layer configured under the substrate; a first display module configured under the sensing layer and corresponding to the first region; and a second display module configured under the sensing layer and corresponding to the second region.

In accordance with another aspect of the present invention, a touch-sensing module is disclosed. The touch-sensing module includes a substrate having a first region, a second region and a flexible region configured between the first region and the second region so as to enable the touch-sensing module to have a folded state and an unfolded state; and a sensing layer configured under the substrate and having a first sensing pattern layer and a second sensing pattern layer. The first sensing pattern layer at least corresponds to the first region, and the second sensing pattern layer at least corresponds to the second region.

In accordance with another aspect of the present invention, a touch-sensing module is disclosed. The touch-sensing module includes a substrate having a first region, a second region and a flexible region configured between the first region and the second region; and a sensing layer configured on the substrate and having a first sensing pattern layer, a second sensing pattern layer and a dummy pattern layer. The first sensing pattern layer is configured on the first region, the second sensing pattern layer is configured on the second region, and the dummy pattern layer is configured on the flexible region.

The above objectives and advantages of the present invention will become more readily apparent to those ordinarily skilled in the art after reviewing the following detailed descriptions and accompanying drawings, in which:

BRIEF DESCRIPTION OF THE DRAWINGS

FIGS. 2A and 2B show a schematic diagram illustrating the structure of the second embodiment of the present invention;

FIGS. 4A and 4B show a schematic diagram illustrating the structure of the fourth embodiment of the present invention;

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 1A:
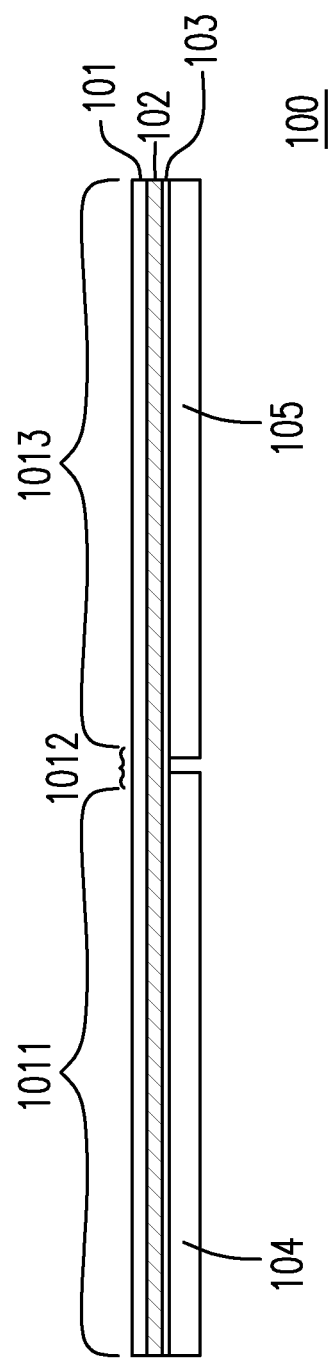
FIGS. 1A, 1B, 1C and 1D show a schematic diagram illustrating the structure of the first embodiment of the present invention.
Figure 1B:
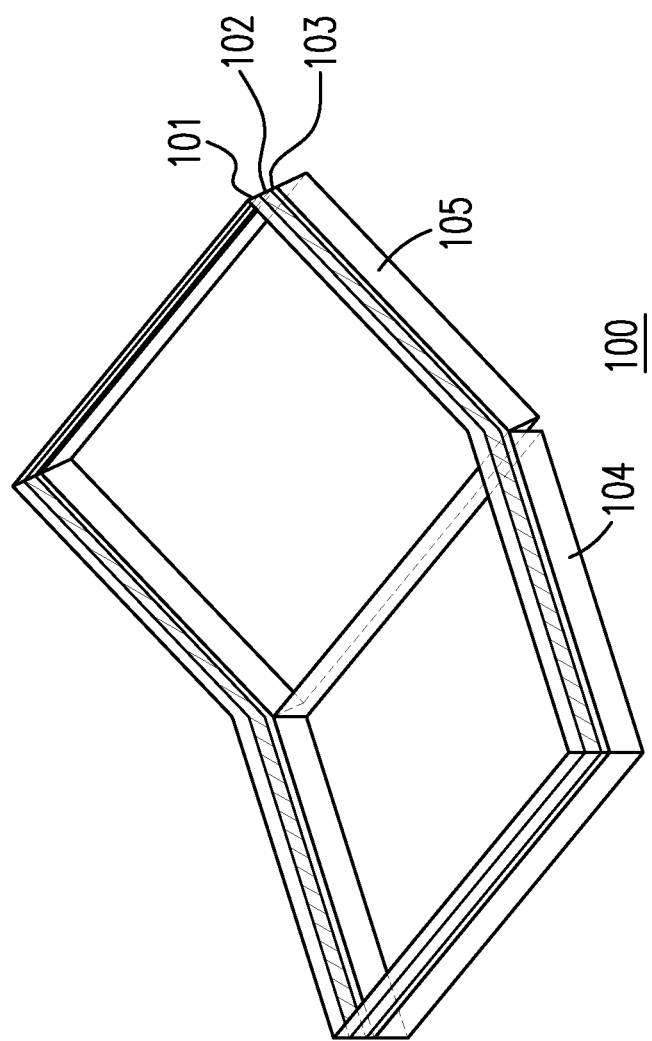
Figure 1C:
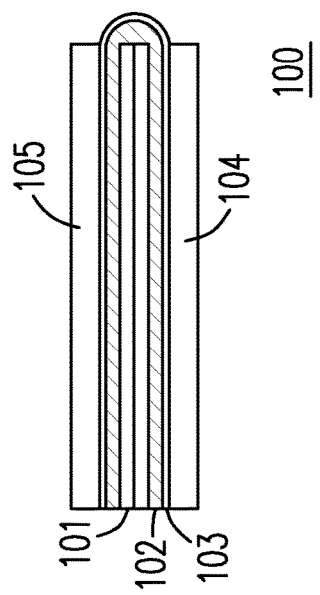
Figure 1D:
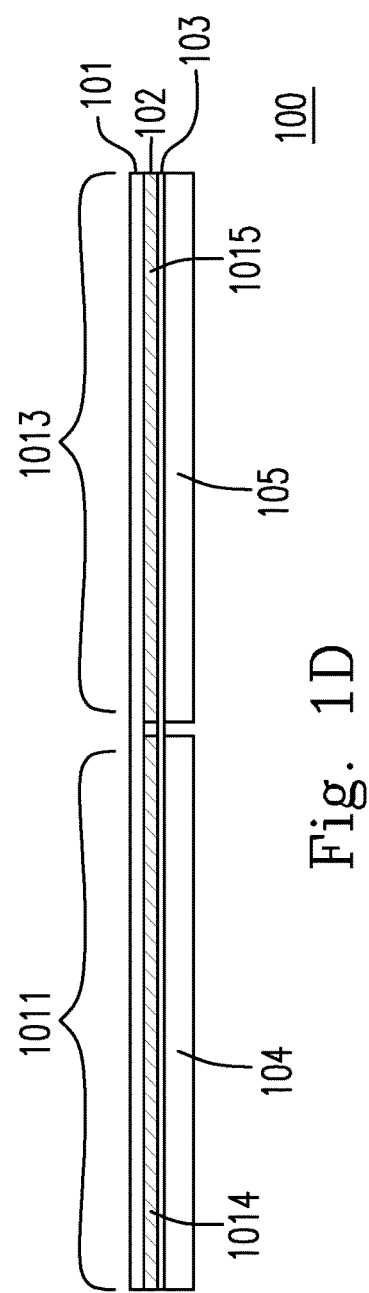

Please refer to FIGS. 1A, 1B, and 1C, which show a schematic diagram illustrating the structure of the first embodiment of the present invention, where the structure of the touch display device 100 includes a substrate 101, a sensing layer 102, an adhesive layer 103, a first display module 104 and a second display module 105, and FIGS. 1A and 1B show the unfolded state and FIG. 1C shows the folded state. The substrate 101 further includes three regions, wherein the three regions are a first region 1011, a flexible region 1012 and a second region 1013, and the flexible region 1012 enables the substrate 101 to have a folded state and an unfolded state. The sensing layer 102 is configured under the substrate 101, the sensing layer 102 is attached to the first display module 104 and the second display module 105 using the adhesive layer 103, and the substrate 101 and the sensing layer 102 are a touch-sensing module. The first display module 104 and the second display module 105 are configured under the sensing layer 102 and respectively correspond to the first region 1011 and the second region 1013 of the substrate 101. In other words, the touch display device 100 mainly consists of a single touch-sensing module and two display modules separated from each other, where the substrate 101 of the touch-sensing module is a flexible substrate which is a one-piece formed flexible substrate rather than an assembled substrate. In addition, the first display module 104 and the second display module 105 can be liquid-crystal display modules (LCM), active-matrix organic light-emitting diodes (AMOLED) modules or other commonly-used display devices. In addition, the first display module 104 and the second display module 105 can be different types of display devices, ex. the first display module 104 is an LCM and the second display module 105 is an AMOLED module. The sensing layer 102 can be sequential electrodes as a whole and configured under the substrate 101 as shown in FIG. 1A, or a first electrode 1014 and a second electrode 1015 (separate from each other) are configured respectively under the first region 1011 and the second region 1013 as shown in FIG. 1D, where there is a gap between the first electrode 1014 and the second electrode 1015. Because the substrate 101 is made of a flexible material, the touch-sensing module consisting of the substrate 101 and the sensing layer 102 can be in a folded state and an unfolded state. Note that the adhesive layer 103 of the present embodiment can be an optically clear adhesive (OCA), and the sensing layer 102 can be a dual layer electrode having x-axis patterns and y-axis patterns interlaced with each other, or a one layer electrode/single layer electrode, or commonly-used electrodes with other structures.

Please refer to FIGS. 2A and 2B, which show a schematic diagram illustrating the structure of the second embodiment of the present invention. The touch display device 200 in the second embodiment includes a substrate 201, a sensing layer 204, an adhesive layer 205, a display module 202 and a flexible display module 203, and the display module 202 and the flexible display module 203 can adhere to each other with glue (not shown), where FIG. 2A shows the unfolded state and FIG. 2B shows the folded state. The substrate 201 and the sensing layer 204 can be deemed as a touch-sensing module, and the touch-sensing module is a flexible touch-sensing module. The sensing layer 204 of the second embodiment can be formed by sequential electrodes as a whole as shown in FIG. 2A, or formed with two separated electrode layers respectively corresponding to the display module 202 and the flexible display module 203 (not shown). The sensing layer 204 can be either sequential electrodes or two separate electrode layers, and the sensing layer 204 of the second embodiment is configured on the same substrate 201 which can be a flexible substrate. In addition, the display module 202 can be an LCM, which is an inflexible display module, and the flexible display module 203 can be an AMOLED display module. In addition, the material of the sensing layer 204 can be a transparent conductive material, such as Indium Tin Oxide (ITO). Preferably, the material of the sensing layer 204 is a metal conductive material, and the sensing layer 204 has a metal-mesh structure. Because metal has better extensibility, the metal-mesh structure can be bent many times without damage. In another embodiment, the material of the sensing layer 204 can be formed of both a transparent conductive material and a metal conductive material. Referring to FIG. 2B, when the touch display device 200 is folded, the two ends of the touch display device 200 can be fixed using a fixing frame 206 or another fixing element/method so as to maintain the folded state. In addition, it can be seen in FIG. 2B that a part of the flexible display module 203 also corresponds to the flexible region, and so the screen displayed in the second embodiment is continuous. If there is no display device corresponding to the flexible region, then the screen will not be sequential. In addition, the display module 202 and the flexible display module 203 can adhere to each other with glue (not shown).

Figure 3A:
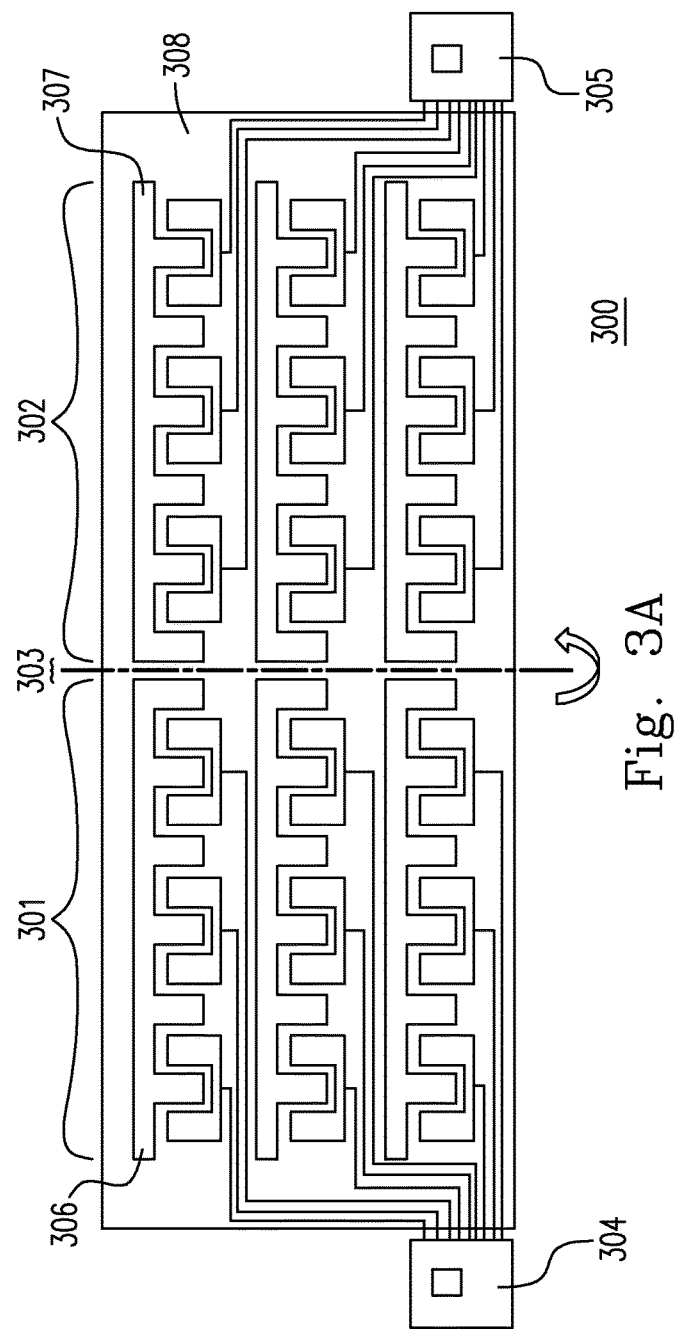
FIGS. 3A and 3B show a schematic diagram illustrating the structure of the third embodiment of the present invention.
Figure 3B:
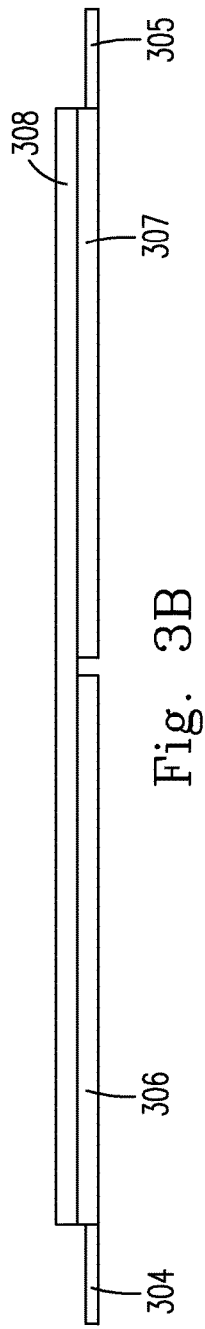

Please refer to FIGS. 3A and 3B, which show a schematic diagram illustrating the structure of the third embodiment of the present invention, where FIG. 3A shows the top view of the touch-sensing module 300, and FIG. 3B shows the side view of the touch-sensing module 300. The touch-sensing module 300 in the third embodiment includes a substrate 308, a first electrode 306, a second electrode 307, a first flexible printed circuit (FPC) 304 and a second FPC 305, where the first electrode 306 and the second electrode 307 form a sensing layer, and the first FPC 304 and the second FPC 305 can be further connected to their own chips or control circuits, or one common chip or control circuit (not shown). The substrate 308 includes a first touch-sensing region 301, a second touch-sensing region 302 and a flexible region 303. Both the first electrode 306 and the second electrode 307 respectively corresponding to the first touch-sensing region 301 and the second touch-sensing region 302 have the structure of a single-layer electrode. The first electrode 306 is configured in the first touch-sensing region 301, the second electrode 307 is configured in the second touch-sensing region 302, the first electrode 306 and the second electrode 307 are electrically connected to the first FPC 304 and the second FPC 305 respectively, and the first electrode 306 and the second electrode 307 are separated from each other by a gap/distance, where the gap/distance corresponds to the flexible region 303. The flexible region 303 of the touch-sensing module 300 can enable the touch-sensing module 300 to have a folded state and an unfolded state. Because there are no sensing electrodes or circuits in the flexible region 303, the touch-sensing module 300 will not have the problem of losing electrical properties resulting from broken wires. As mentioned in the first and the second embodiments, the touch-sensing module 300 of the third embodiment can be configured with the same kind or different kinds of display modules under the first touch-sensing region 301 and the second touch-sensing region 302.

Please refer to FIGS. 4A and 4B, which show a schematic diagram illustrating the structure of the forth embodiment of the present invention, where FIG. 4A shows the top view of the touch-sensing module 400, and FIG. 4B shows the side view of the touch-sensing module 400. The touch-sensing module 400 includes a substrate 410, a first X-axis pattern electrode 406, a first Y-axis pattern electrode 407, a second X-axis pattern electrode 408, a second Y-axis pattern electrode 409, a first flexible printed circuit (FPC) 404 and a second FPC 405, where the first X-axis pattern electrode 406, the first Y-axis pattern electrode 407, the second X-axis pattern electrode 408 and the second Y-axis pattern electrode 409 form a sensing layer, and the first FPC 404 and the second FPC 405 can be further connected to chips or control circuits (not shown). The touch-sensing module 400 includes a first touch-sensing region 401, a second touch-sensing region 402 and a flexible region 403. The first X-axis pattern electrode 406 and the first Y-axis pattern electrode 407 are configured in the first touch-sensing region 401 and electrically connected to the first FPC 404, and the second X-axis pattern electrode 408 and the second Y-axis pattern electrode 409 are configured in the second touch-sensing region 402 and electrically connected to the second FPC 405. That is to say, both the first touch-sensing region 401 and the second touch-sensing region 402 have the structure of a dual-layer electrode. In addition, the first touch-sensing region 401 and the second touch-sensing region 402 are configured to be isolated from each other. The flexible region 403 of the touch-sensing module 400 can enable the touch-sensing module 400 to have a folded state and an unfolded state. Because there are no sensing electrodes or circuits in the flexible region 403, the touch-sensing module 400 will not have the problem of losing electrical properties resulting from broken wires. As mentioned in the first and the second embodiments, the touch-sensing module 400 of the forth embodiment can be configured with the same kind or different kinds of display modules respectively under the first touch-sensing region 401 and the second touch-sensing region 402.

Figure 5:
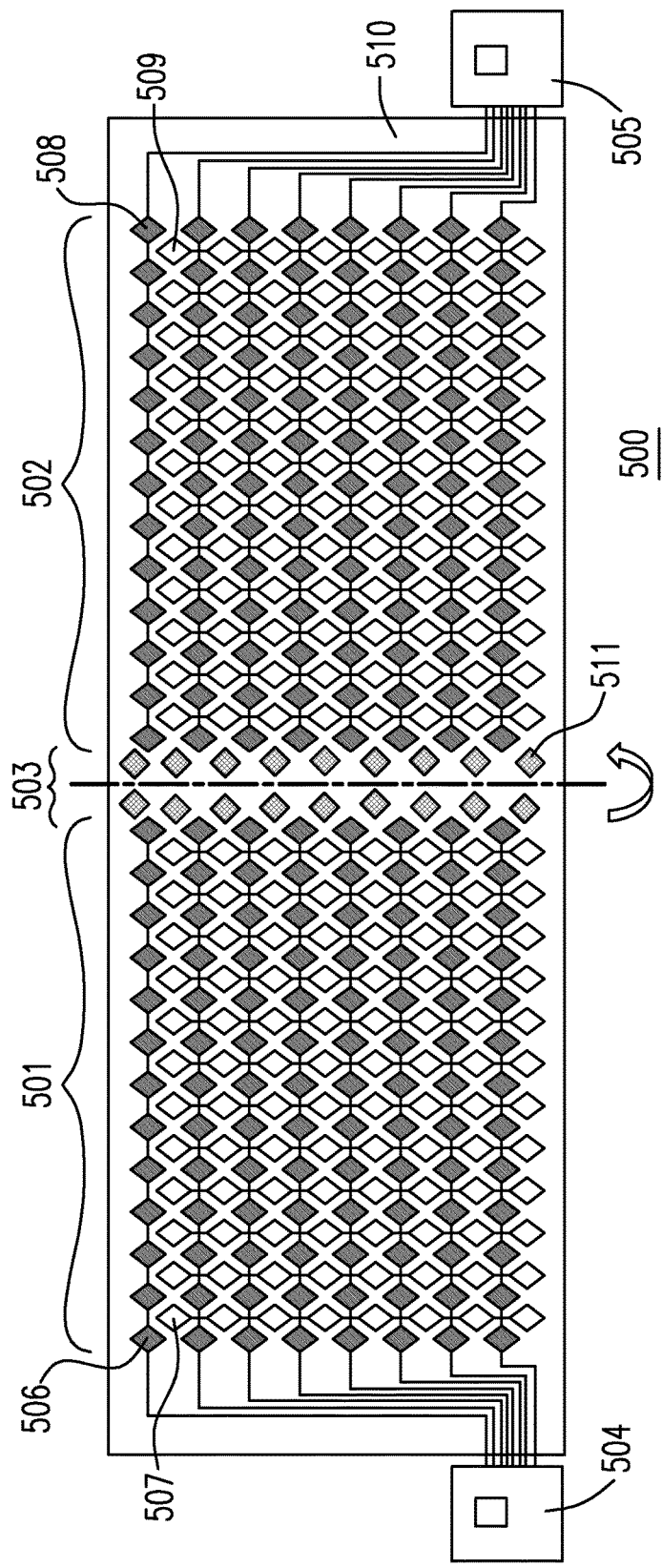
FIG. 5 shows a schematic diagram illustrating the structure of the fifth embodiment of the present invention.

Please refer to FIG. 5, which shows a schematic diagram illustrating the structure of the fifth embodiment of the present invention. The touch-sensing module 500 includes a substrate 510, a first X-axis pattern electrode 506, a first Y-axis pattern electrode 507, a second X-axis pattern electrode 508, a second Y-axis pattern electrode 509, a first flexible printed circuit (FPC) 504, a second FPC 505 and a plurality of dummy patterns 511, where the first X-axis pattern electrode 506, the first Y-axis pattern electrode 507, the second X-axis pattern electrode 508 and the second Y-axis pattern electrode 509 form a sensing layer, and the first FPC 504 and the second FPC 505 can be further respectively connected to chips or control circuits (not shown). The touch-sensing module 500 includes a first touch-sensing region 501, a second touch-sensing region 502 and a flexible region 503. The first X-axis pattern electrode 506 and the first Y-axis pattern electrode 507 are configured in the first touch-sensing region 501 and electrically connected to the first FPC 504, and the second X-axis pattern electrode 508 and the second Y-axis pattern electrode 509 are configured in the second touch-sensing region 502 and electrically connected to the second FPC 505. In addition, the first touch-sensing region 501 and the second touch-sensing region are separated from each other by a distance/gap. The flexible region 503 of the touch-sensing module 500 can enable the touch-sensing module 500 to have a folded state and an unfolded state. Furthermore, because there is a plurality of dummy patterns 511 in the flexible region 503, it can solve the problem of poor visibility resulting from no electrodes configured in the flexible region. Preferably, the shape and configuration of the plurality of dummy patterns 511 are the same as those of the electrode patterns in the first touch-sensing region 501 and the second touch-sensing region 502, and each unit of the plurality of dummy patterns 511 is a rhombus or diamond shape. The dummy patterns 511 are electrically isolated from the first touch-sensing region 501 and the second touch-sensing region 502. As mentioned in the first and the second embodiments, the touch-sensing module 500 of the fourth embodiment can be configured with the same kind or different kinds of display modules under the first touch-sensing region 501 and the second touch-sensing region 502.

Figure 6:
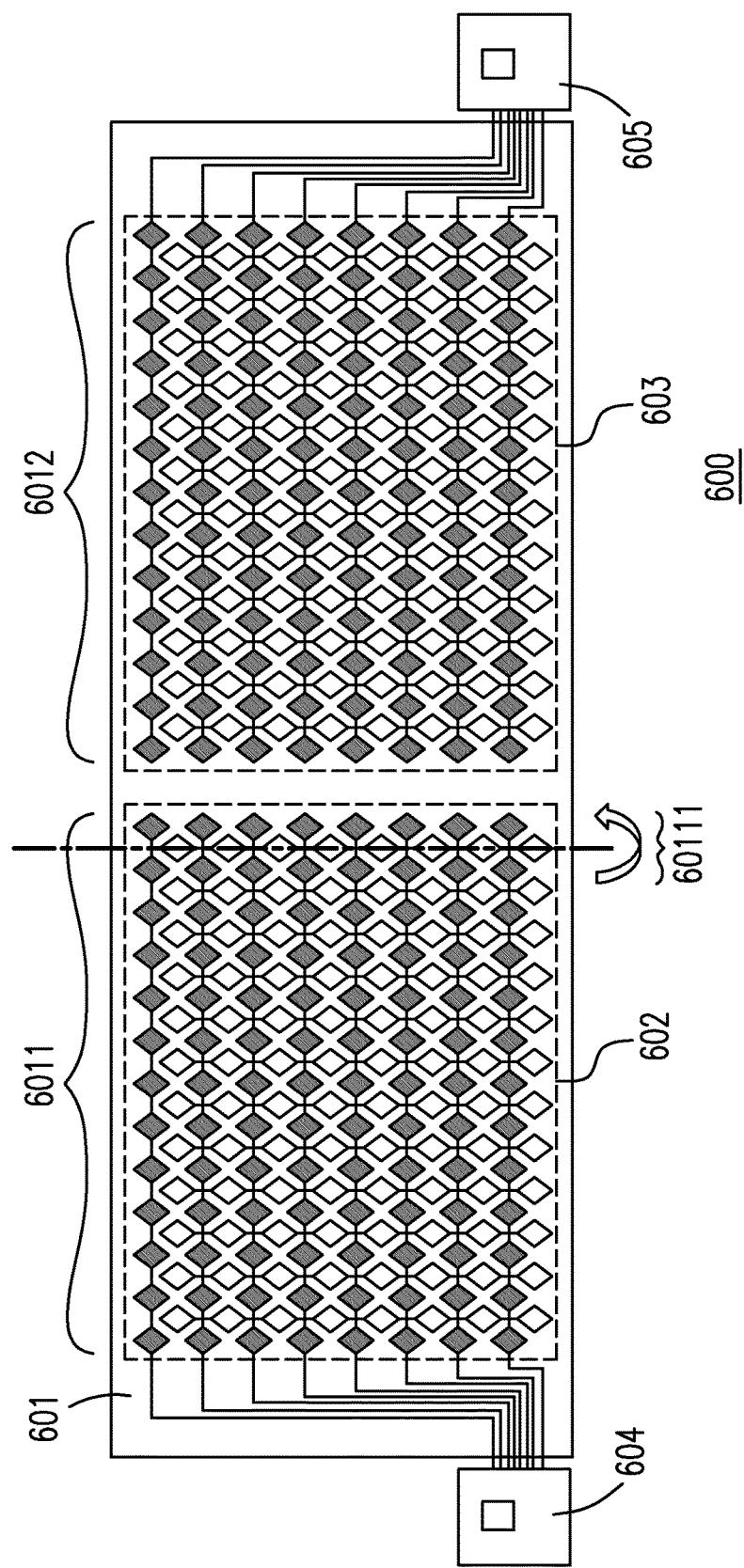
FIG. 6, shows a schematic diagram illustrating the structure of the sixth embodiment of the present invention.

Please refer to FIG. 6, which shows a schematic diagram illustrating the structure of the sixth embodiment of the present invention. The touch display device 600 includes a substrate 601, a first touch-sensing layer 602, a second touch-sensing layer 603, a first FPC 604 and a second FPC 605. The substrate 601 further includes a first region 6011 and a second region 6012, and the first region 6011 has a flexible region 60111 so as to enable the substrate 601 to have a folded state and an unfolded state. The first touch-sensing layer 602 is configured under the substrate 601 and positionally corresponds to the first region 6011 (including the flexible region 60111), and the second touch-sensing layer 603 is configured under the substrate 601 and positionally corresponds to the second region 6012. In addition, the first touch-sensing layer 602 and the second touch-sensing layer 603 are separated from each other by a distance/gap, and respectively electrically connected to the first FPC 604 and the second FPC 605. Preferably, the first touch-sensing layer 602 is a flexible transparent conductive layer, such as a metal conductive film, and the second touch-sensing layer 603 is a transparent conductive layer, such as indium tin oxide (ITO) layer but it is not limited thereto. In addition, a flexible display module and an inflexible display module can be configured respectively in the first region 6011 and the second region 6012. Because the first touch-sensing layer 602 and the flexible display module are flexible, they can be correspondingly configured under the first region 6011 (including the flexible region 6012). Also, the touch-sensing layer of the present embodiment can be a single layer or a dual layer. Note that in the present embodiment, if two different transparent conductive films are integrated into a flexible touch-sensing module, the portion of the sensing layer extending across the flexible region 60111 is a flexible conductive film, which can be bent many times without damage. If a metal conductive material and transparent conductive material are integrated into a flexible touch display device, the first touch-sensing layer 602 can be made of a metal conductive material and extend across the flexible region 60111 (which can be bent many times without damage) and the second touch-sensing layer 603 can be made of the transparent conductive material, such as ITO. In another embodiment, the first and the second touch-sensing layers can both be formed of the metal conductive material or the transparent conductive material.

Figure 7:
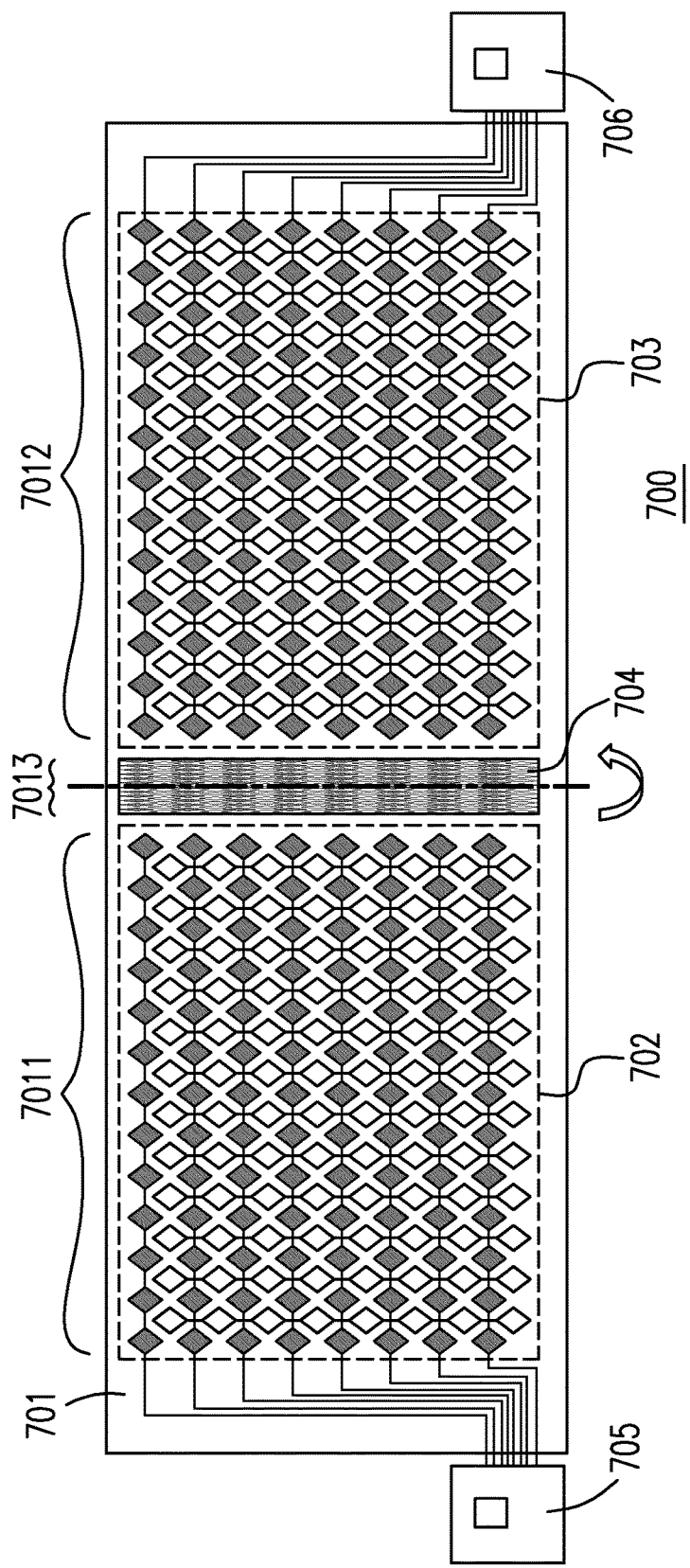
FIG. 7 shows a schematic diagram illustrating the structure of the seventh embodiment of the present invention.

Please refer to FIG. 7, which shows a schematic diagram illustrating the structure of the seventh embodiment of the present invention. The touch-sensing module 700 includes a substrate 701, a first touch-sensing layer 702, a second touch-sensing layer 703, a metal mesh layer 704, a first FPC 705 and a second FPC 706. The substrate 701 further includes three regions. The three regions are a first region 7011, a second region 7012 and a flexible region 7013, and the flexible region 7013 can enable the substrate 701 to have a folded state and an unfolded state. The first touch-sensing layer 702 is configured under the substrate 701 and corresponds to the first region 7011, the second touch-sensing layer 703 is configured under the substrate 701 and corresponds to the second region 7012, and the first touch-sensing layer 702 and the second touch-sensing layer 703 are separated from each other by a distance/gap and respectively electrically connected to the first FPC 705 and the second FPC 706. The metal mesh layer 704 is configured under the substrate 701 and corresponds to the flexible region 7013, where the metal mesh layer 704 is electrically isolated from the first touch-sensing layer 702 and the second touch-sensing layer 703. In addition, the metal mesh layer 704 can be electrically connected to the first FPC 705, the second FPC 706 or another FPC to provide the touch-sensing function. Because what is bent is a metal mesh, it can bear more times of being bent. The first touch-sensing layer 702 and the second touch-sensing layer 703 can be indium tin oxide (ITO) layers or metal mesh layers. Note that the metal mesh layer 704 can also be connected to a chip or a control circuit and thus have the touch-sensing function, and so the flexible region can also have touch-sensing function so as to improve the sensing ability of the touch-sensing module 700. Furthermore, because the metal material can bear being bent more times, this will avoid any disconnection when a user uses the touch-sensing module.

Figure 8:
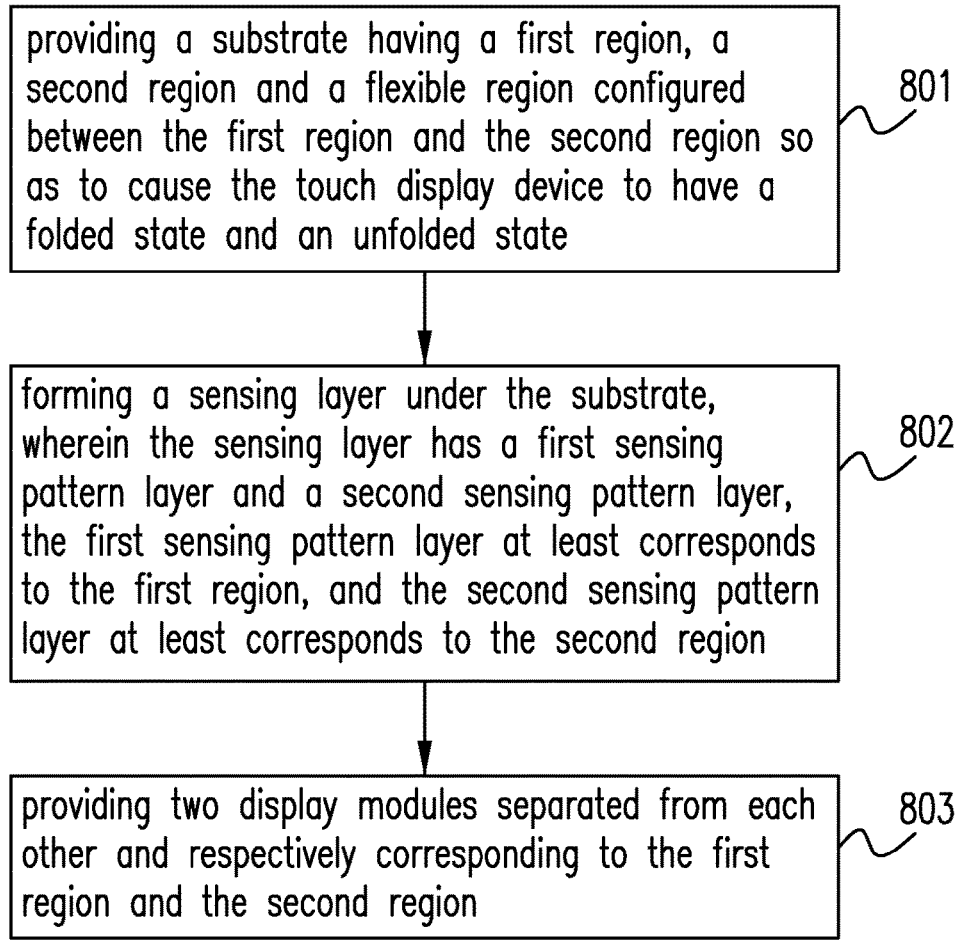
FIG. 8 is a flow chart schematically showing the manufacturing method for a touch display device of the present invention.

Please refer to FIG. 8, which is a flow chart schematically showing the manufacturing method for a touch display device of the present invention. The steps for the manufacturing method 800 are illustrated as follows.

Step 801: Providing a substrate having a first region, a second region and a flexible region configured between the first region and the second region so as to enable the touch display device to have a folded state and an unfolded state, wherein the substrate is a one-pieced form flexible substrate.

Step 802: Forming a sensing layer under the substrate, wherein the sensing layer has a first sensing pattern layer and a second sensing pattern layer, the first sensing pattern layer at least corresponds to the first region, and the second sensing pattern layer at least corresponds to the second region. Preferably, the first sensing pattern layer and the second sensing pattern layer are electrically isolated from each other by a distance/gap, the sensing layer further includes a dummy pattern layer or a metal-mesh layer disposed within the distance/gap, the dummy pattern layer or the metal-mesh layer corresponds to the flexible region, and the metal-mesh layer also has a touch-sensing function.

Step 803: Providing two display modules separated from each other and respectively corresponding to the first region and the second region. The two display modules can be the same type of display module, such as LCD modules, or different types of display modules, such as an LCD module and an AMOLED module.

A design for a one-pieced flexible touch-sensing module is disclosed in the present invention to provide the touch-sensing function for the entire screen, and solves the problem that a large-sized touch display device takes space and is not easy to carry and store. In addition, the design of two separate touch-sensing layers configured on the two sides of the flexible region solves the problem that the wires may easy be broken when the flexible region is bent, which would result in the device not properly functioning. Furthermore, the touch display module of the embodiments mentioned above can only be connected to one FPC, and the separate touch-sensing layers can be electrically connected using high-strength wires or through wireless communication.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch display device, comprising:
    a substrate having a first region, a second region and a flexible region configured between the first region and the second region so as to enable the touch display device to have a folded state and an unfolded state;
    a sensing layer configured under the substrate and having a first sensing pattern layer and a second sensing pattern layer, wherein the first sensing pattern layer positionally corresponds to the first region, the second sensing pattern layer positionally corresponds to the second region, both the first sensing pattern layer and the second sensing pattern layer include one of an indium tin oxide (ITO) and a metal-mesh layer, the first sensing pattern layer and the second sensing pattern layer are physically separated from each other and have a distance therebetween so that the first sensing pattern layer and the second sensing pattern layer are electrically isolated from each other;
    a first display module configured under the sensing layer and positionally corresponding to the first region; and
    a second display module configured under the sensing layer and positionally corresponding to the second region, wherein the first display module and the second display module are physically separated from each other, the first display module is adhered to the second display module with glue, the first display module is an inflexible liquid crystal display module, and the second display module is a flexible active-matrix organic light-emitting diode (AMOLED) display module.

2. The touch display device as claimed in claim 1, wherein the first sensing pattern layer and the second sensing pattern layer are connected to each other.

3. The touch display device as claimed in claim 1, wherein:
    the sensing layer further includes a dummy pattern layer configured between the first sensing pattern layer and the second sensing pattern layer; and
    the dummy pattern layer positionally corresponds to the flexible region and is electrically isolated from the first sensing pattern layer and the second sensing pattern layer.

4. The touch display device as claimed in claim 1, wherein the first sensing pattern layer and the second sensing pattern layer are separated from each other and have a distance therebetween, the sensing layer further includes a metal mesh layer configured between the first sensing pattern layer and the second sensing pattern layer, positionally corresponding to the flexible region and providing a touch control function, and the metal mesh layer is electrically isolated from the first sensing pattern layer and the second sensing pattern layer.

5. The touch display device as claimed in claim 1, wherein the first sensing pattern layer is one of a one-layer structure and a dual-layer structure, and the second sensing pattern layer is one of a one-layer structure and a dual-layer structure.

6. The touch display device as claimed in claim 1, further comprising a fixing element configured to fix the substrate during the folded state.

7. The touch display device as claimed in claim 1, further comprising an adhesive layer configured between the sensing layer and the first and the second display modules to combine the sensing layer and the first and the second display modules.

8. The touch display device as claimed in claim 1, wherein the substrate is a one-piece formed flexible substrate.

9. A touch-sensing module, comprising:
    a substrate having a first region, a second region and a flexible region configured between the first region and the second region so as to enable the touch-sensing module to have a folded state and an unfolded state; a sensing layer configured under the substrate and having a first sensing pattern layer and a second sensing pattern layer, wherein the first sensing pattern layer positionally corresponds to the first region, the second sensing pattern layer positionally corresponds to the second region, both the first sensing pattern layer and the second sensing pattern layer include one of an indium tin oxide (ITO) and a metal-mesh layer, and the first sensing pattern layer and the second sensing pattern layer are physically separated from each other and have a distance therebetween so that the first sensing pattern layer and the second sensing pattern layer are electrically isolated from each other; and a first display module and a second display module are configured under the sensing layer, wherein the first display module is configured positionally corresponding to the first region, the second display module is configured positionally corresponding to the second region, the first display module and the second display module are physically separated from each other, the first display module is adhered to the second display module with glue, the first display module is an inflexible liquid crystal display module, and the second display module is a flexible active-matrix organic light-emitting diode (AMOLED) display module.

10. The touch-sensing module as claimed in claim 9, wherein the substrate is a one-piece formed flexible substrate.

11. The touch-sensing module as claimed in claim 9, wherein:
the sensing layer further includes a dummy pattern layer configured between the first sensing pattern layer and the second sensing pattern layer; and
the dummy pattern layer positionally corresponds to the flexible region and is electrically isolated from the first sensing pattern layer and the second sensing pattern layer.

12. The touch-sensing module as claimed in claim 11, wherein the first sensing pattern layer and the second sensing pattern layer include a material being a transparent conductive material.

13. The touch-sensing module as claimed in claim 11, wherein the dummy pattern layer includes a material being a metal conductive material.

14. The touch-sensing module as claimed in claim 1, wherein the first sensing pattern layer covers an area positionally corresponding to those of the first region and the flexible region, the second sensing pattern layer covers an area positionally corresponding to that of the second region, and the first sensing pattern layer is a flexible conductive film.

15. The touch-sensing module as claimed in claim 14, wherein the flexible conductive film extends across the flexible region.

16. A method for manufacturing a touch display device, comprising:
providing a substrate having a first region, a second region and a flexible region configured between the first region and the second region so as to enable the touch display device to have a folded state and an unfolded state;
forming a sensing layer under the substrate, wherein the sensing layer has a first sensing pattern layer and a second sensing pattern layer, the first sensing pattern layer positionally corresponds to the first region, the second sensing pattern layer positionally corresponds to the second region, both the first sensing pattern layer and the second sensing pattern layer include one of an indium tin oxide (ITO) and a metal-mesh layer, the first sensing pattern layer and the second sensing pattern layer are physically separated from each other and have a distance therebetween so that the first sensing pattern layer and the second sensing pattern layer are electrically isolated from each other;
forming a first display module configured under the sensing layer and positionally corresponding to the first region; and
forming a second display module configured under the sensing layer and positionally corresponding to the second region, wherein the first display module and the second display module are physically separated from each other, the first display module is adhered to the second display module with glue, the first display module is an inflexible liquid crystal display module, and the second display module is a flexible active-matrix organic light-emitting diode (AMOLED) display module.

17. The method as claimed in claim 16, wherein the substrate is a one-piece formed flexible substrate.

18. The method as claimed in claim 16, wherein the first sensing pattern layer and the second sensing pattern layer include a material being a transparent conductive material.

* * * * *